US009815248B2

(12) United States Patent
Tada et al.

(10) Patent No.: US 9,815,248 B2
(45) Date of Patent: Nov. 14, 2017

(54) METHOD AND DEVICE FOR DETECTING MATERIAL BONDING PROBLEMS INSIDE TIRE

(71) Applicant: The Yokohama Rubber Co., LTD., Minato-ku, Tokyo (JP)

(72) Inventors: Hirotaro Tada, Hiratsuka (JP); Masamichi Oyama, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/110,591

(22) PCT Filed: Jan. 9, 2015

(86) PCT No.: PCT/JP2015/050473
§ 371 (c)(1),
(2) Date: Jul. 8, 2016

(87) PCT Pub. No.: WO2015/105173
PCT Pub. Date: Jul. 16, 2015

(65) Prior Publication Data
US 2016/0339658 A1 Nov. 24, 2016

(30) Foreign Application Priority Data
Jan. 10, 2014 (JP) .................. 2014-003154

(51) Int. Cl.
*G06K 9/00* (2006.01)
*B29D 30/00* (2006.01)
(Continued)

(52) U.S. Cl.
CPC ............ *B29D 30/0061* (2013.01); *G06T 5/00* (2013.01); *G06T 7/0004* (2013.01); *G06T 7/11* (2017.01);
(Continued)

(58) Field of Classification Search
None
See application file for complete search history.

(56) References Cited

U.S. PATENT DOCUMENTS

2005/0259859 A1* 11/2005 Hassler ................. G01B 11/25
382/141
2009/0281738 A1 11/2009 Fujisawa
(Continued)

FOREIGN PATENT DOCUMENTS

JP 2004-354258 12/2004
JP 2007-333531 12/2007
(Continued)

OTHER PUBLICATIONS

International Search Report for International Application No. PCT/JP2015/050473 dated Apr. 7, 2015, 4 pages, Japan.

*Primary Examiner* — Weiwen Yang
(74) *Attorney, Agent, or Firm* — Thorpe North & Western

(57) ABSTRACT

From three-dimensional numerical data of surface irregularities of a tire inner surface in a tire of a construction where a sheet member is disposed on the tire circumference, a tire inner surface image is formed for which height direction data of the surface irregularities of the tire inner surface are expressed as pixel gradation values, and the tire circumferential direction and the tire width direction on the tire inner surface correspond to either of the longitudinal direction and the lateral direction of the image. A surface irregularity enhanced image is generated by subjecting this tire inner surface image to spatial frequency processing using a low-pass filter for the tire width direction and a band-pass filter for the tire circumferential direction. A determination is made of whether a recessed region exists which indicates a bonding defect of the end portions of the sheet member.

16 Claims, 12 Drawing Sheets

(51) Int. Cl.
*G06T 5/00* (2006.01)
*G06T 7/00* (2017.01)
*G06T 7/60* (2017.01)
*G06T 17/00* (2006.01)
*G06T 7/70* (2017.01)
*G06T 7/11* (2017.01)

(52) U.S. Cl.
CPC ............... *G06T 7/60* (2013.01); *G06T 7/70* (2017.01); *G06T 17/00* (2013.01); *B29D 2030/0066* (2013.01); *G06T 2207/20112* (2013.01); *G06T 2207/20172* (2013.01); *G06T 2207/30108* (2013.01); *G06T 2207/30252* (2013.01)

(56) References Cited

U.S. PATENT DOCUMENTS

| | | | |
|---|---|---|---|
| 2012/0092149 A1* | 4/2012 | Fujisawa | G01B 11/245 340/442 |
| 2014/0086453 A1* | 3/2014 | Imada | G01B 11/30 382/103 |
| 2014/0270390 A1 | 9/2014 | Zanella et al. | |
| 2014/0297224 A1* | 10/2014 | Takeda | G01B 11/24 702/167 |

FOREIGN PATENT DOCUMENTS

| | | |
|---|---|---|
| JP | 2009-115512 | 5/2009 |
| JP | 2012-047478 | 3/2012 |
| WO | WO 2007/145245 | 12/2007 |
| WO | WO 2012/143199 | 10/2012 |

* cited by examiner

METHOD AND DEVICE FOR DETECTING MATERIAL BONDING PROBLEMS INSIDE TIRE

TECHNICAL FIELD

The present technology relates to a method and device for a bonding defect of material inside a tire.

BACKGROUND ART

Conventionally, there have been cases where, of the materials constituting a tire, the amount of bonding is insufficient (bonded section is separated) for sheet members such as reinforcing sheet members and the like, namely, a carcass and an inner liner. In such cases, there is a risk of the tire bursting and, as such, there is a need to detect bonding defects in reinforcing sheet members prior to shipping and prevent the distribution of defective tires. In tires where the sheet members are appropriately disposed, both end portions of the sheet members faces in the tire circumferential direction, and a portion of both end portions are overlapped (bonded to each other) on the tire circumference. Thus, a structure is obtained in which the sheet members are disposed throughout the entire circumference of the tire. However, in tires where a bonding defect of the sheet member exists, only slight irregularities occur in the completed tire surface. Thus, even if inspected by a person visually or through tactile sensation, there is a high possibility that the defect will be missed.

Devices for automatically detecting such a bonding defect of sheet members are known (e.g. see Japanese Unexamined Patent Application Publication No. 2004-354258A).

In the device described in Japanese Unexamined Patent Application Publication No. 2004-354258A, to produce a pneumatic tire, a ring band-like sheet material is formed by connecting ends of a sheet member. When inspecting the bonded portion of the sheet member, the ring band-like sheet material is wound on a drum and, in this state, the drum is rotated at a constant speed. While rotating the drum, an optical displacement sensor positioned near the drum surface is used to acquire displacement signals related to sheet thickness.

Furthermore, these displacement signals are sampled on the basis of the frequency of a clock that is incorporated into an arithmetic processing mechanism of a computer device, and distance of the drum circumferential direction corresponding to the sampling interval is calculated from the relationship between the clock frequency and the drum rotation speed.

As a result, waveform data pertaining to sheet thickness of the ring band-like sheet material is generated and, in this waveform data, a point where the value of the displacement signal related to the sheet thickness begins to deviate from a predetermined range or begins to return to within the predetermined range is determined as a leading edge and/or trailing edge of a protruding region or a recessed region.

Furthermore, an irregularity region dimension in the drum circumferential direction of the protruding region or the recessed region is calculated on the basis of the determined leading edge and/or trailing edge, and a determination is made as to whether this irregularity region dimension data is within a specified range or within an acceptable range.

Devices such as that described in Japanese Unexamined Patent Application Publication No. 2004-354258A perform detection while the ring band-like sheet material is wound on the drum, and are incapable of performing detection on completed tires.

SUMMARY

The present technology provides technology for a method and device for detecting a bonding defect of material inside tires whereby bonding defects of sheet members such as carcasses and inner liners in completed tires can be detected.

The present technology has the following aspects.

Aspect 1

A method for detecting a bonding defect of a sheet member embedded in a tire, the method comprising the steps of:

acquiring three-dimensional numerical data of surface irregularities of a tire inner surface in a tire of a construction where a sheet member is disposed on a tire circumference, both end portions of the sheet member facing in a tire circumferential direction;

creating a tire inner surface image from the acquired three-dimensional numerical data, the image expressing height direction data of the surface irregularities as pixel gradation values, while the tire circumferential direction and a tire width direction on the tire inner surface correspond to either of a longitudinal direction and a lateral direction of the image;

generating a surface irregularity enhanced image from the tire inner surface image in which the surface irregularities of the tire inner surface are enhanced; and extracting a protruding region and potential recessed regions of the surface irregularities on a basis of the pixel gradation values of the surface irregularity enhanced image, and determining on a basis of position information of the protruding region whether or not a recessed region exists among the potential recessed regions, the recessed region indicating a bonding defect of the end portions of the sheet member.

Aspect 2

The method according to Aspect 1, wherein the step of determining a step of determining potential recessed regions located within a range of a predetermined distance from locations of the protruding region as non-recessed regions and determining, among the potential recessed regions, a potential recessed region other than the non-recessed regions as the recessed region.

Aspect 3

The method according to Aspect 1 or 2, wherein:

the step of generating the surface irregularity enhanced image includes subjecting the tire inner surface image to spatial frequency processing; and the spatial frequency processing includes filtering processing using:

a low-pass filter for the tire width direction having an upper cutoff frequency at an absolute value of a spatial frequency, and a band-pass filter for the tire circumferential direction having lower and upper cutoff frequencies at absolute values of spatial frequencies.

Aspect 4

The method according to Aspect 3, wherein the absolute value of the upper cutoff frequency of the low-pass filter is lower than the absolute value of the lower cutoff frequency of the band-pass filter.

Aspect 5

The method according to Aspect 3 or 4, wherein the step of generating the surface irregularity enhanced image includes generating the surface irregularity enhanced image by subjecting a two-dimensional Fourier transform image of the tire inner surface image to the spatial frequency processing and, thereafter, performing a two-dimensional inverse Fourier transform.

Aspect 6

The method according to any one of Aspects 1 to 5, wherein:

the protruding region is a region for which pixel gradation values of the surface irregularity enhanced image are greater than or equal to a first threshold value and an area is greater than or equal to a predetermined threshold value; and the potential recessed regions are regions for which the pixel gradation values of the surface irregularity enhanced image are less than or equal to a second threshold value.

Aspect 7

The method according to any one of Aspects 1 to 6, wherein the step of determining further includes a step of enlarging the recessed region in the tire width direction by subjecting the recessed region to expansion processing in the tire width direction, and displaying an image in which a mark is added to the surface irregularity enhanced image at the location of the enlarged recessed region, when determined that the recessed region exists.

Aspect 8

The method according to any one of Aspects 1 to 7, wherein the step of acquiring the data of the surface irregularities in a step of acquiring the three-dimensional numerical data of the surface irregularities by measuring the surface irregularities of the tire inner surface using a two-dimensional laser displacement meter or an optical cutting method measuring instrument.

Aspect 9

A device for detecting a bonding defect of a sheet member embedded in a tire, the device comprising:

an acquisition unit configured to acquire three-dimensional numerical data of surface irregularities of a tire inner surface in a tire of a construction where a sheet member is disposed on a tire circumference, both end portions of the sheet member facing in a tire circumferential direction;

an image creation unit configured to create a tire inner surface image from the acquired three-dimensional numerical data that expresses height direction data of the surface irregularities as pixel gradation values, while the tire circumferential direction and a tire width direction on the tire inner surface correspond to either of a longitudinal direction and a lateral direction of the image;

an image processing unit configured to generate a surface irregularity enhanced image from the tire inner surface image in which the surface irregularities of the tire inner surface are enhanced; and a determination unit configured to extract a protruding region and potential recessed regions of the surface irregularities on a basis of the pixel gradation values of the surface irregularity enhanced image, and determine on a basis of position information of the protruding regions whether or not a recessed region exists among the potential recessed regions, the recessed region indicating a bonding defect of the end portions of the sheet member.

Aspect 10

The device according to Aspect 9, wherein the determination unit determines potential recessed regions located within a range of a predetermined distance from locations of the protruding regions as non-recessed regions and, among the potential recessed region, determines a potential recessed region other than the non-recessed regions as the recessed region.

Aspect 11

The device according to Aspect 9 or 10, wherein:

the image processing unit performs spatial frequency processing on the tire inner surface image; and the spatial frequency processing includes filtering processing using:

a low-pass filter for the tire width direction having an upper cutoff frequency at an absolute value of a spatial frequency, and a band-pass filter for the tire circumferential direction having lower and upper cutoff frequencies at absolute values of spatial frequencies.

Aspect 12

The device according to Aspect 11, wherein the absolute value of the upper cutoff frequency of the low-pass filter is lower than the absolute value of the lower cutoff frequency of the band-pass filter.

Aspect 13

The device according to Aspect 11 or 12, wherein the image processing unit generates the surface irregularity enhanced image by performing the spatial frequency processing on a two-dimensional Fourier transform image of the tire inner surface image and, thereafter, performing a two-dimensional inverse Fourier transform.

Aspect 14

The device according to any one of Aspects 9 to 13, wherein:

the protruding region is a region for which pixel gradation values of the surface irregularity enhanced image are greater than or equal to a first threshold value and an area is greater than or equal to a predetermined threshold value; and the potential recessed regions are regions for which pixel gradation values of the surface irregularity enhanced image are less than or equal to a second threshold value.

Aspect 15

The device according to any one Aspects 9 to 14, further including a display unit configured to display an image, wherein:

the image processing unit enlarges the recessed region in the tire width direction by subjecting the recessed region to expansion processing in the tire width direction, and creates a display-use image in which a mark is added at a location of the enlarged recessed region, when the determination unit determines that the recessed region exists; and the display unit displays the display-use image.

Aspect 16

The device according to any one of Aspects 9 to 15, further including a two-dimensional laser displacement meter or an optical cutting method measuring instrument by which the surface irregularities of the tire inner surface are measured, for acquiring the data of the surface irregularities.

Additionally, the present technology includes the detection method and detection device of the following, more specific aspects.

Specifically, the detection method is a detection method for detecting a bonding defect of a reinforcing sheet member of a completed tire in which end portions of the reinforcing sheet members embedded in the tire face in the circumferential direction of the tire and joined together, and the reinforcing sheet member is disposed throughout the entire circumference of the tire.

The following are used in this detection method: an optical measuring apparatus having a two-dimensional laser displacement meter or an optical cutting method measuring instrument, and an inspection device that detects a bonding defect of the reinforcing sheet member on the basis of measurement results output from the optical measuring apparatus.

The optical measuring apparatus measures an inner surface shape of the tire, converts irregular states of the tire inner surface to three-dimensional numerical data, and outputs this three-dimensional numerical data to the inspection device.

After converting the three-dimensional numerical data inputted from the optical measuring apparatus to an image, the inspection device performs two-dimensional Fourier transform processing on the image; extracts one or more recessed or protruding regions from the results of the two-dimensional Fourier transform processing for which an absolute value of the spatial frequency of the width direction of the tire is a low spatial frequency greater than or equal to 0 and less than or equal to N (>0), and an absolute value of the spatial frequency of the circumferential direction of the tire is greater than or equal to M (>N) and less than or equal to L (>M); and transforms the image by performing a two-dimensional inverse Fourier transform on the extracted regions.

The inspection device extracts the following from the gradation data of the image corresponding to height direction numerical data separate from the width direction numerical data and the circumferential direction numerical data of the tire in the three-dimensional numerical data: the protruding region for which numerical values are greater than or equal to the first threshold value; the potential recessed regions for which the numerical values are less than or equal to the second threshold value; and an overlapping portion of both end portions of the reinforcing sheet members for which the area of the extracted protruding region is greater than or equal to a predetermined threshold value.

The inspection device determines a potential recessed region, other than the potential recessed regions that exist near the overlapping portion, as the recessed region. In cases where the recessed region exists, the detection device connects the recessed regions that are connectible in the width direction of the tire and determines such as a new recessed region. In cases where recessed regions greater than or equal to a predetermined threshold exist, the detection device determines that the recessed region is a gap between adjacent both end portions of the reinforcing sheet member and that a bonding defect in the reinforcing sheet member exists.

Additionally, the detection device is a material bonding defect detection device for detecting a bonding defect of a reinforcing sheet member of a completed tire in which end portions of the reinforcing sheet member embedded in the tire face in the circumferential direction of the tire and joined together, and the reinforcing sheet member is disposed throughout the entire circumference of the tire.

The detection device includes an optical measuring apparatus that has a two-dimensional laser displacement meter or an optical cutting method measuring instrument, measures an inner surface shape of the tire, converts irregular states of the tire inner surface to three-dimensional numerical data, and outputs this three-dimensional numerical data; and an inspection device that detects a bonding defect of the reinforcing sheet members on the basis of measurement results output from the optical measuring apparatus.

The inspection device includes:

Fourier transform means for performing two-dimensional Fourier transform processing on the image, to which the three-dimensional numerical data inputted from the optical measuring apparatus has been transformed;

irregularity extraction means for extracting one or more recessed or protruding regions from results of the two-dimensional Fourier transform processing for which an absolute value of the spatial frequency of the width direction of the tire is a low spatial frequency greater than or equal to 0 and less than or equal to N (>O), and an absolute value of the spatial frequency of the circumferential direction of the tire is greater than or equal to M (>N) and less than or equal to L (>M);

inverse Fourier transform means for transforming the extracted regions to images via two-dimensional inverse Fourier transforming;

potential recessed regions extraction means for extracting, from the gradation data of the image corresponding to height direction numerical data separate from the width direction numerical data and the circumferential direction numerical data of the tire in the three-dimensional numerical data, a protruding region for which numerical values are greater than or equal to a first threshold value and potential recessed regions for which numerical value are less than or equal to a second threshold value;

overlapping portion extraction means for extracting an overlapping portion of both end portions of a reinforcing sheet member for which an area of the extracted protruding region is greater than or equal to a predetermined threshold value;

recessed region determination means for determining a potential recessed region, other than the potential recessed regions that exist near the overlapping portion, as the recessed region; and determination means for, when the recessed region exists, connecting recessed regions that are connectible in the width direction of the tire and determining such as a new recessed region, and when recessed regions greater than or equal to a predetermined threshold exist, determining that the recessed region is a gap between adjacent both end portions of the reinforcing sheet member and that a bonding defect in the reinforcing sheet member exists.

According to the method and device of the present technology, three-dimensional numerical data of the tire inner surface shape is acquired and an image obtained from this three-dimensional numerical data is processed. As a result, bonding defects of sheet members such as reinforcing sheet members can be automatically extracted. Therefore, determination of a bonding defect of a sheet member can be carried out at higher accuracy than in conventional technologies, and determination having perfect reproducibility is achieved.

DETAILED DESCRIPTION

Figure 1:
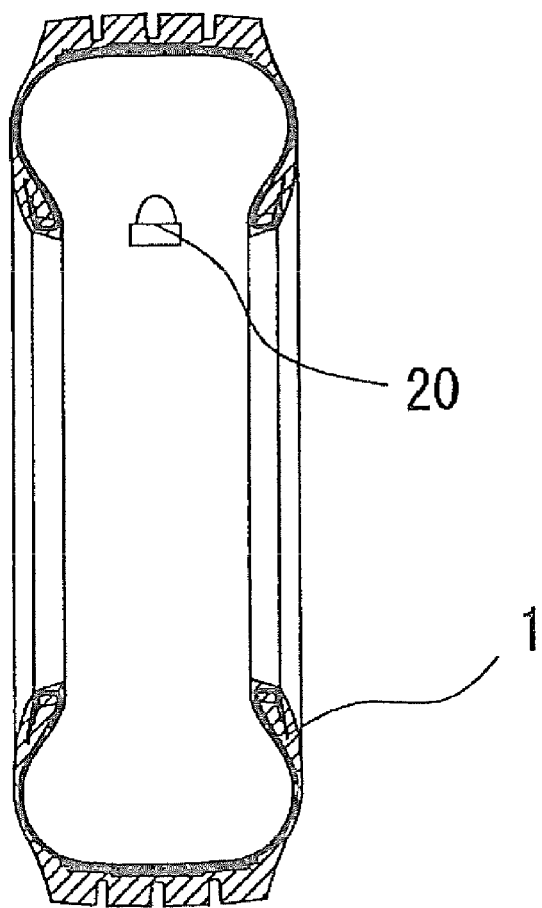
FIG. 1 is a schematic view illustrating a positional relationship between a tire and an optical measuring apparatus according to an embodiment of the present technology.
Figure 2:
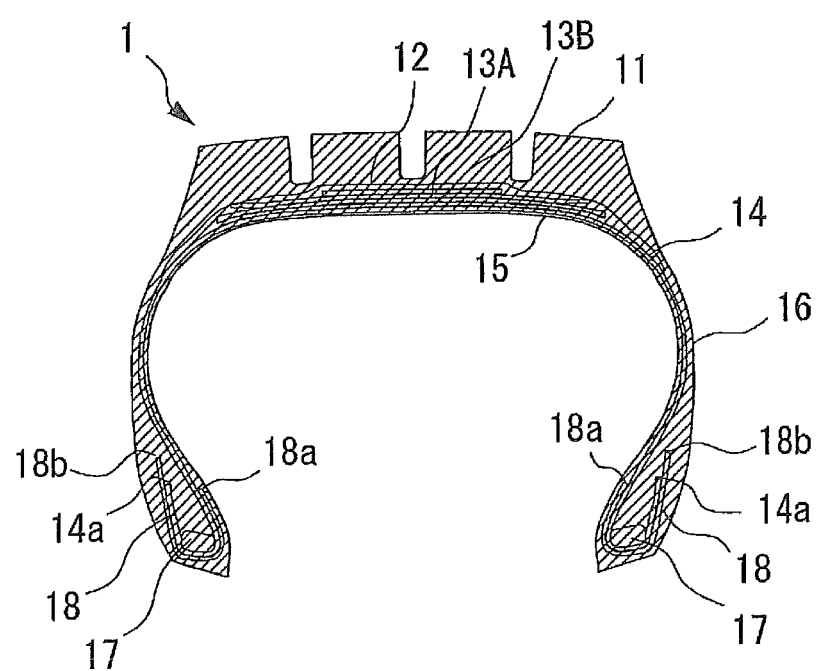
FIG. 2 is a cross-sectional view of the tire according to the embodiment of the present technology.
Figure 3:
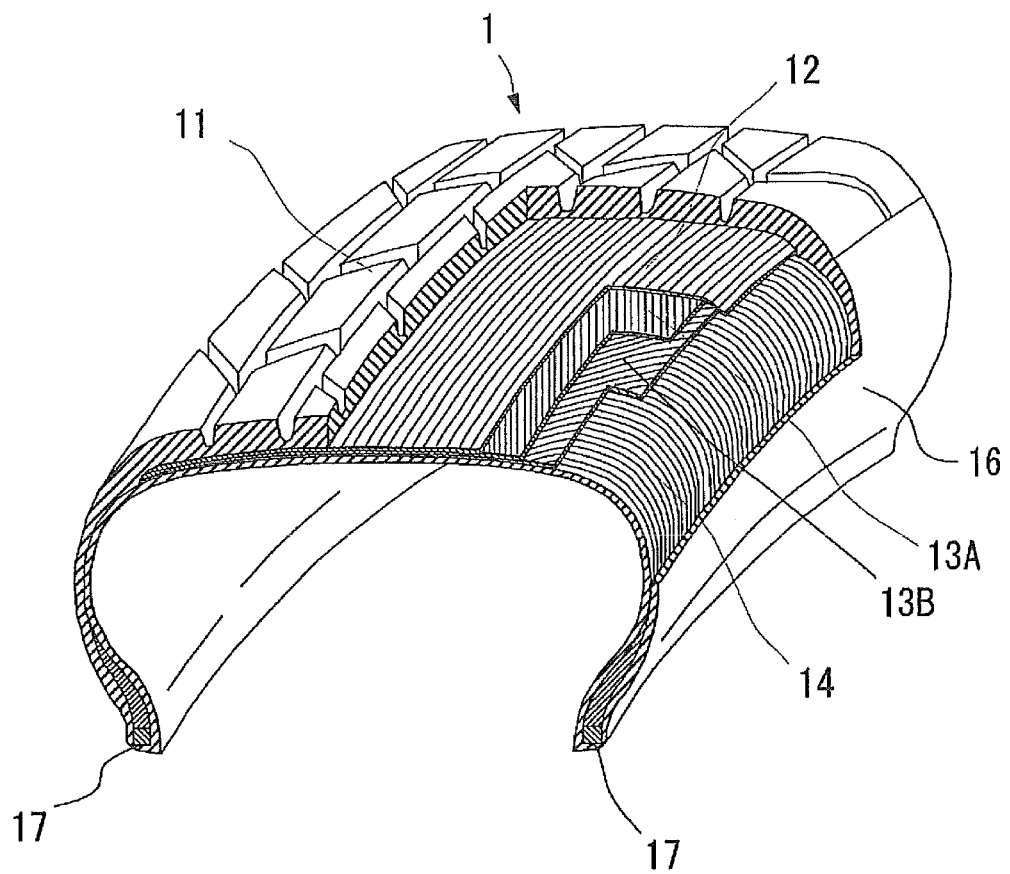
FIG. 3 is a partial cutaway perspective view of the tire according to the embodiment of the present technology.
Figure 4:
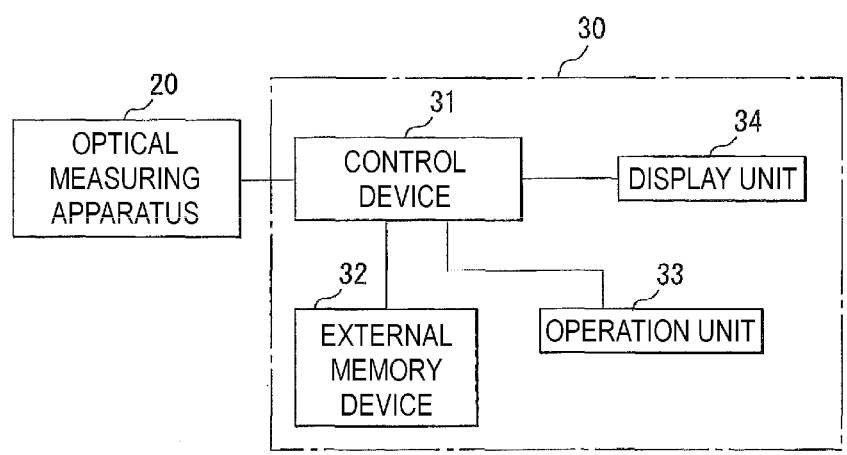
FIG. 4 is a block diagram of a tire inspection device according to the embodiment of the present technology.
Figure 5:
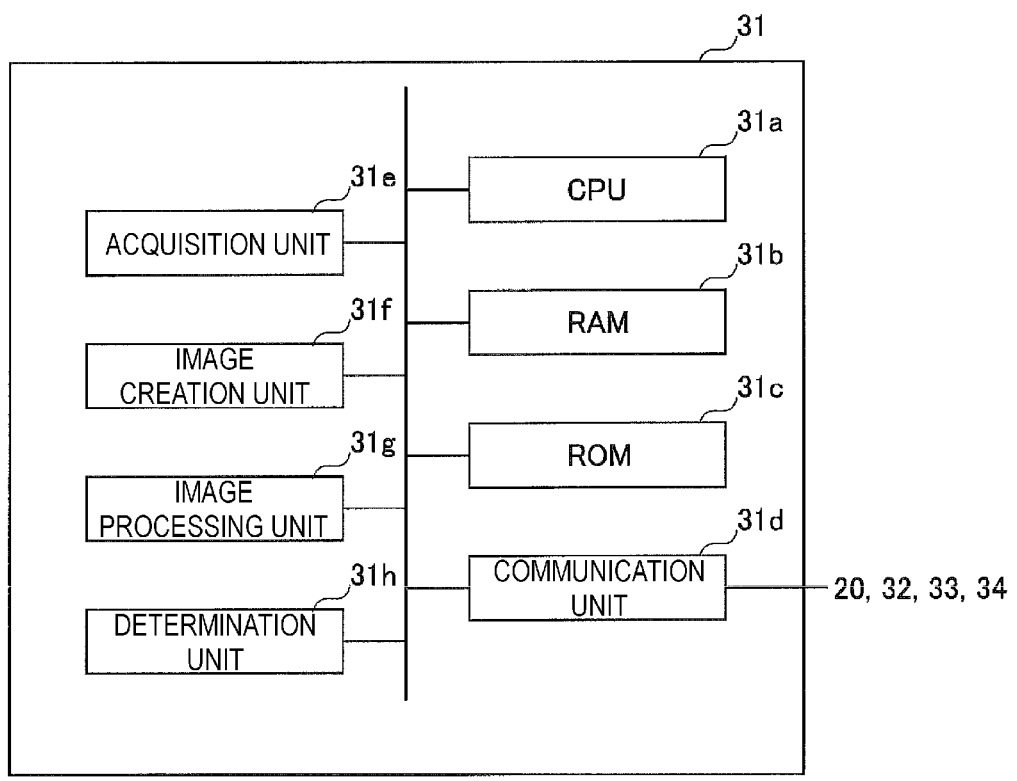
FIG. 5 is a block diagram explaining in more detail the control device illustrated in FIG. 4.
Figure 6:
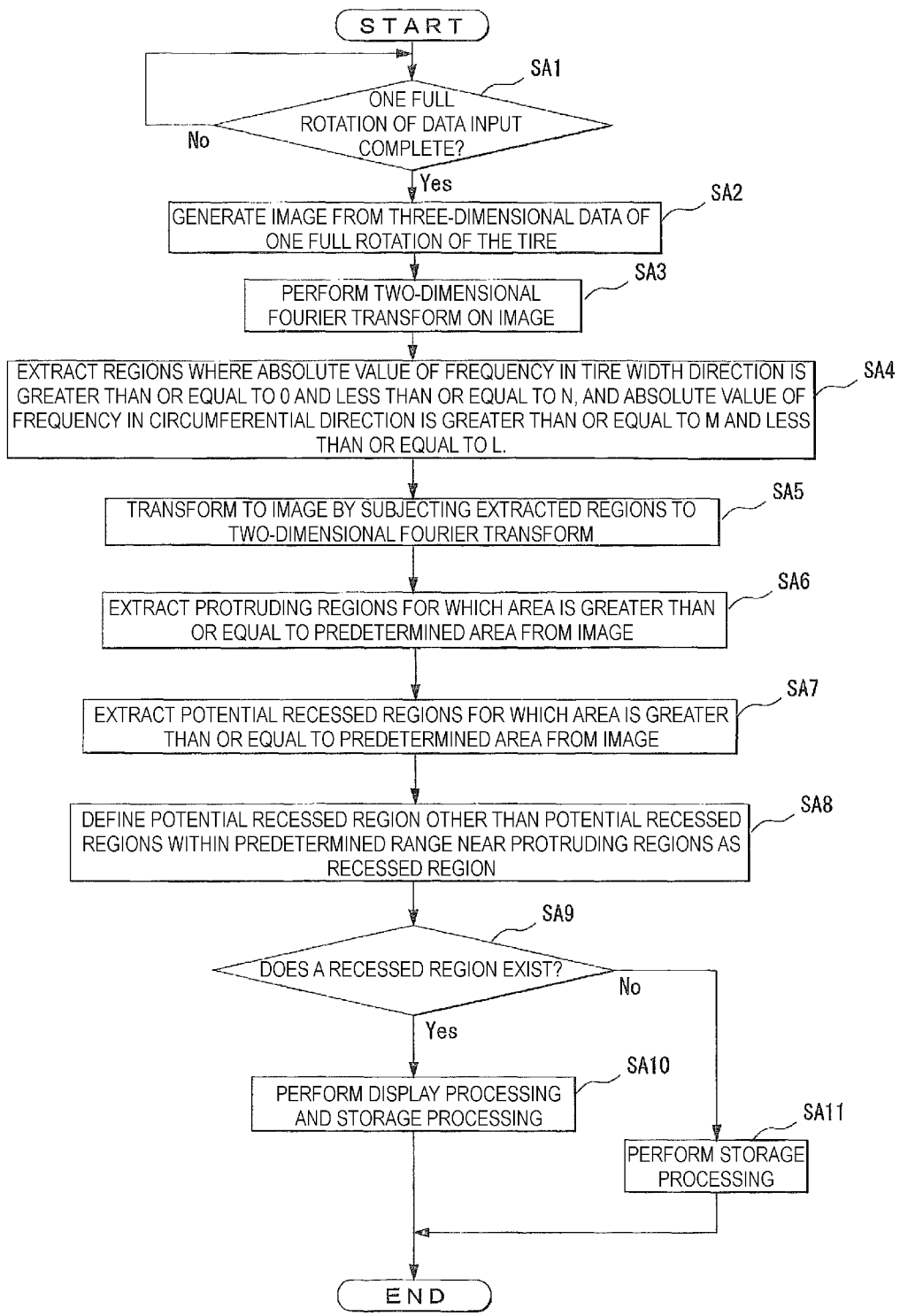
FIG. 6 is a flow chart showing operations of the control device according to the embodiment of the present technology.

FIGS. 1 to 12 illustrate the present embodiment. FIG. 1 is a schematic view illustrating a positional relationship between a tire and an optical measuring apparatus. FIG. 2 is a cross-sectional view of the tire. FIG. 3 is a partial cutaway perspective view of the tire. FIG. 4 is a block diagram of a tire inspection device. FIG. 6 is a flow chart showing operations of a control device. FIGS. 7 to 11 are schematic views of images processed by the control device.

The tire detection device of the present embodiment is provided with an optical measuring apparatus 20 disposed on an inner circumferential surface side of a tire 1, and an inspection device main body 30 connected to the optical measuring apparatus 20. Additionally, the tire 1 is disposed so as to be rotatably supported by a supporting apparatus (not illustrated in the drawings).

The tire 1 is, for example, a commonly known tubeless radial tire, and is constituted from commonly known cap tread 11, under tread 12, belts 13A and 13B, carcass 14, inner liner 15, sidewall 16, and the like. Furthermore, end portions in a tire width direction of the carcass 14 are folded back outward so as to wind around beads 17. Moreover, a steel chafer 18 is provided so as to cover the carcass end portions.

The optical measuring apparatus 20 has a two-dimensional laser displacement meter or an optical cutting method measuring instrument as a shape measurement sensor, measures an inner surface shape, specifically surface irregularities of the inner surface, of the tire 1, transforms the tire inner surface shape to three-dimensional numerical data, and outputs this three-dimensional numerical data to the inspection device main body 30. Note that, the measurement includes acquiring the three-dimensional numerical data of the tire inner surface shape by rotating the tire 1 or sensor 360 degrees or more while maintaining a constant distance between the sensor and the tire inner surface, and outputting this numerical data to the inspection device main body 30. Here, the tire inner surface shape is a concavoconvex shape of a surface of the inner liner 15 facing a tire cavity region filled with air and formed between the tire 1 and a rim (not illustrated in the drawings) on which the tire 1 is mounted.

As illustrated in FIG. 4, the inspection device main body 30 is provided with a control device 31 constituted by a commonly known computer device, an external memory device 32 connected to the control device 31, an operation unit 33 that has a mouse, a keyboard, or the like and is connected to the control device 31, and a display unit 34 that has a liquid crystal display. FIG. 5 is a block diagram explaining in more detail the control device 31 illustrated in FIG. 4.

The control device 31 is provided with a CPU 31a, RAM 31b, ROM 31c, and a communication unit 31d, and is further provided with an acquisition unit 31e, an image creation unit 31f, an image processing unit 31g, and a determination unit 31h. Results of processing by the control device 31 described hereinafter are temporarily saved in the RAM 31b. Control programs and programs for various types of processing are stored in the ROM 31c. The communication unit 31d is connected to the optical measuring apparatus 20, the external memory device 32, the operation unit 33, and the display unit 34.

The acquisition unit 31e is a portion for acquiring data sent from an external device, namely, the optical measuring apparatus 20. The image creation unit 31f is a portion for creating an image from the data sent from the optical measuring apparatus 20. The image processing unit 31g is a portion for processing the created image. The determination unit 31h is a portion for determining a bonding defect of a sheet member from the processed image.

The acquisition unit 31e, the image creation unit 31f, the image processing unit 31g, and the determination unit 31h are modules formed by calling up the programs stored in the ROM 31c and executing the programs, that is, these units are program modules. The functions of the acquisition unit 31e, the image creation unit 31f, the image processing unit 31g, and the determination unit 31h are described together with the following description of the operations of the control device 31.

The acquisition unit 31e of the control device 31 acquires three-dimensional data inputted from the optical measuring apparatus 20 and stores this three-dimensional data in the external memory device 32. The image creation unit 31f calls up the three-dimensional data stored in the external memory device 32, transforms this three-dimensional data to an image, and stores this image in the external memory device 32. Additionally, the control device 31 stores numerical data and the like inputted from the operation unit 33 and also acquires operation commands and the like. Furthermore, the control device 31 displays the detection results on the display unit 34.

In the tire inspection device having the configuration described above, the tire 1 is rotated in the circumferential direction at a predetermined speed using the support apparatus (not illustrated) described above and, while rotating, three-dimensional data representing the tire inner surface shape measured by the optical measuring apparatus 20 is inputted to the control device 31 of the inspection device main body 30. The three-dimensional data inputted to the control device 31 is stored in the external memory device 32. After data of one full rotation of the tire 1 is acquired, a determination is made through the processing described hereinafter as to whether or not the amount of bonding of each of the carcass 14 and the inner liner 15 (the sheet member) is insufficient.

Figure 7:
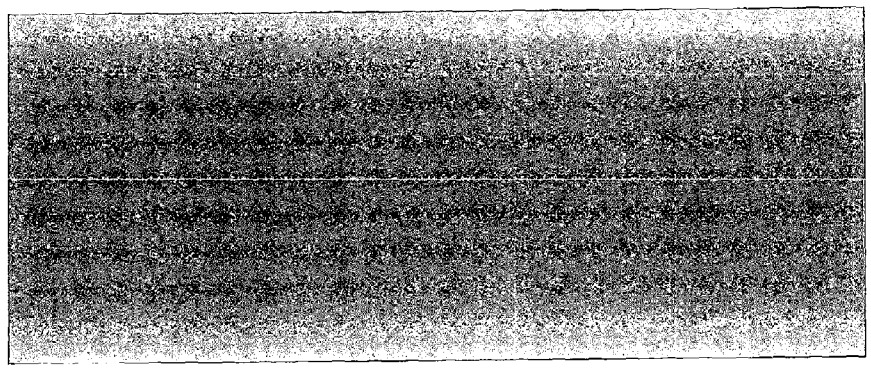
FIG. 7 is a figure illustrating an image created from three-dimensional numerical data according to the embodiment of the present technology.

Specifically, as shown in the flow chart of FIG. 6, upon the control device 31 receiving the input of the three-dimensional data of one full rotation of the tire 1 from the optical measuring apparatus 20 and the acquisition unit 31e acquiring the three-dimensional data (SA1), the image creation unit 31f creates an image using the three-dimensional data of one full rotation of the tire 1 (SA2). The data acquired from the acquisition unit 31e is three-dimensional numerical data of the surface irregularities of the tire inner surface in a tire of a construction where the sheet members such as the carcass 14 and the inner liner 15 are disposed on the tire circumference, both end portions of each of the sheet members facing in a tire circumferential direction. Here, the image creation unit 31f of the control device 31 creates an image where the width direction numerical data, the circumferential direction numerical data, and the height direction numerical data of the three-dimensional data representing the irregular state of the measured tire inner surface are the width direction numerical data, circumferential direction numerical data, and gradation data (pixel gradation values) representing brightness, respectively, of the image. That is, the image creation unit 31f creates a tire inner surface image. Thus, an image such as that illustrated in FIG. 7 is created. The image that the image creation unit 31f creates is an image that represents the height direction data of the surface irregularities of the tire inner surface as pixel gradation values, and is a tire inner surface image created so that the tire circumferential direction and the tire width direction on the tire inner surface correspond to one of the longitudinal direction and the lateral direction of the image. In the image illustrated in FIG. 7, the lateral direction in the figure corresponds to the tire circumferential direction and the vertical direction in the figure corresponds to the tire width direction. In the image illustrated in FIG. 7, it is nearly impossible to discern irregularities on the basis of the gradation data.

Figure 8:
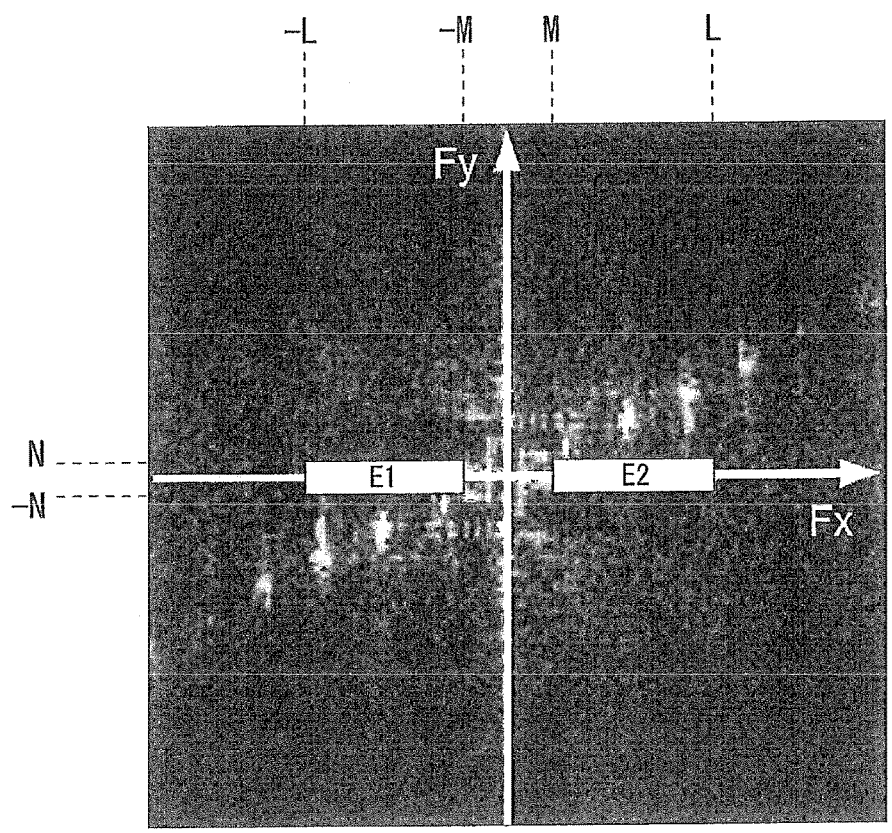
FIG. 8 is a figure illustrating two-dimensional Fourier transform results according to the embodiment of the present technology.

Next, the image processing unit 31g of the control device 31 performs two-dimensional Fourier transform processing on the created image (SA3); and extracts one or more recessed or protruding regions from the results of the two-dimensional Fourier transform processing for which an absolute value of the spatial frequency of the width direction of the tire 1 is a low spatial frequency greater than or equal to 0 and less than or equal to N (>0), and an absolute value of the spatial frequency of the circumferential direction of the tire is greater than or equal to M (>N) and less than or equal to L (>M) (SA4). Thus, as illustrated in FIG. 8, two regions E1 and E2 are extracted.

Specifically, the image processing unit 31g performs spatial frequency processing on the image created by the image creation unit 31f, that is, the tire inner surface image using a low-pass filter for the tire width direction having an upper cutoff frequency at an absolute value of the spatial frequency, and a band-pass filter for the tire circumferential direction having lower and upper cutoff frequencies at absolute values of the spatial frequencies.

Note that in the present embodiment, cutoff frequencies of spatial frequencies represented by the number of pixels and corresponding to N=7, M=20, and L=200 are set in the spatial frequency image subjected to two-dimensional Fourier transform processing (image size: 800 pixels×15,000 pixels). As described above, by limiting the spatial frequency of the width direction to the low frequency region (|Fy|≤N), slight changes of high spatial frequencies of the width direction of the image can be eliminated. That is, in the spatial frequency processing, image processing for the tire width direction is performed using the low-pass filter having an upper cutoff frequency at an absolute value of the spatial frequency. Herein, N corresponds to the upper cutoff frequency of the low-pass filter.

Furthermore, by restricting the spatial frequency band of the circumferential direction to the spatial frequency band of the irregularities (M≤|Fx|≤L), global changes of the circumferential direction of the image and slight changes of high spatial frequencies are eliminated, and member splices (portions where the sheet members (carcass and inner liner) overlap) and member openings (portions where the sheet members (carcass and inner liner) do not overlap and a gap is present) are enhanced. In other words, the surface irregularities of the tire inner surface are enhanced. In the spatial frequency processing described above, image processing for the tire circumferential direction is preferably performed using the band-pass filter having lower and upper cutoff frequencies at absolute values of the spatial frequencies. Herein, M and L correspond to the lower and the upper cutoff frequencies of the band-pass filter. Preferably, spatial frequency bands are confirmed beforehand that take high values when member splices of a normal state and member splices of an abnormal state (openings and the like) exist in order to set the upper cutoff frequency of the band-pass filter. Additionally, the upper cutoff frequency of the low-pass filter, for example, N described above, is dependent on the profile and the field of view in the width direction, and M and L are dependent on the field of view in the circumferential direction (number of cycles). Note that the absolute value of the upper cutoff frequency of the low-pass filter is preferably lower than the absolute value of the lower cutoff frequency of the band-pass filter because the protruding regions, the potential recessed regions, and the recessed regions extending along the tire width direction will be stably extracted.

Figure 9:
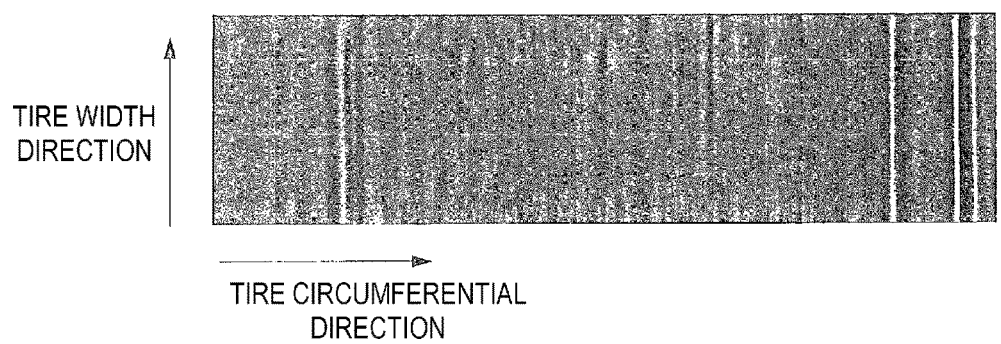
FIG. 9 is a figure illustrating an image obtained from two-dimensional inverse Fourier transform results according to the embodiment of the present technology.

Next, the image processing unit 31g performs two-dimensional inverse Fourier transform processing on the spatial frequency regions E1 and E2 extracted via the processing in SA4 described above. Thereby, the spatial frequency regions E1 and E2 are transformed into an image of the tire inner surface where the tire vertical direction and the tire width direction are the lateral direction and the longitudinal direction; that is, the spatial frequency regions E1 and E2 are transformed into a surface irregularity enhanced image for which the surface irregularities of the tire inner surface are enhanced. Then, this image (the surface irregularity enhanced image) is stored in the external memory device 32 (SA5). Thus, an image (surface irregularity enhanced image) such as that illustrated in FIG. 9 is created. As is clear from the image (the surface irregularity enhanced image) illustrated in FIG. 9, the irregular portions can be clarified by subjecting the regions E1 and E2, extracted in the processing of SA4 described above, to two-dimensional inverse Fourier transform and creating the image (the surface irregularity enhanced image). In this image, the tire width direction is the width direction of the image or, rather, corresponds to the longitudinal direction of FIG. 9; and the tire circumferential direction is the length direction of the image or, rather, corresponds to the lateral direction of FIG. 9. Additionally, the height direction numerical data of the optical measurement results described above is the gradation data of the brightness of the image or, rather, corresponds to the pixel gradation values. Here, the pixel gradation values are expressed in 256 levels from 0 to 255 and the lower the height of the surface irregularities, that is, the more recessed from the tire inner surface to the tire side, the closer the color will be to level 0 (black), and the higher the height of the surface irregularities, the closer the color will be to level 255 (white).

Figure 10:
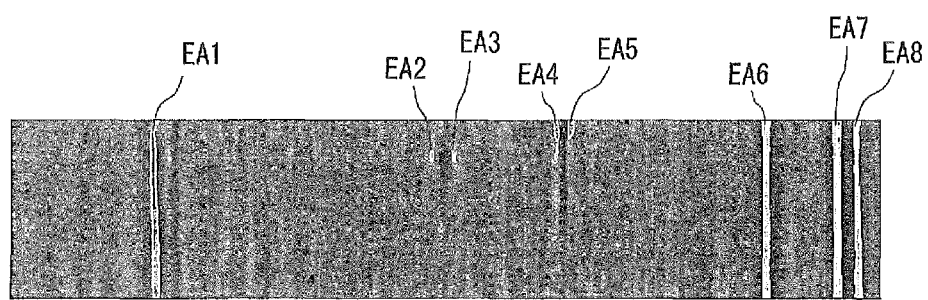
FIG. 10 is a figure illustrating an example of protruding regions extracted in the embodiment of the present technology.

Furthermore, the determination unit 31h of the control device 31 extracts protrusions (white regions), for which the pixel gradation values are greater than or equal to a predetermined value, from the image (surface irregularity enhanced image) created in the processing of SA5 described above and, from the extracted protrusions, further extracts protruding regions for which an area is greater than or equal to a predetermined area (SA6). For example, as illustrated in FIG. 10, regions EA1 to EA8 are extracted as protrusions for which the pixel gradation values are greater than or equal to the predetermined value, and protrusions of small area EA2 to EA5 exist. Thus, these protrusions EA2 to EA5 of small area are removed and the regions EA1 and EA6 to EA8 are extracted as protruding regions. These protruding regions EA1 and EA6 to EA8 are portions where a sheet member (the carcass or the inner liner) overlaps itself.

Figure 11:
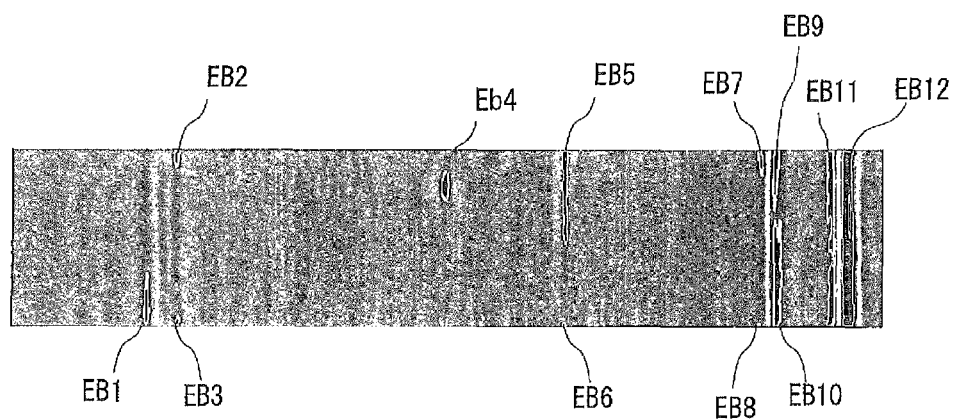
FIG. 11 is a figure illustrating an example of potential recessed regions extracted in the embodiment of the present technology.

Next, the determination unit 31h of the control device 31 extracts recesses (black regions), for which the pixel gradation values are less than or equal to a predetermined value, from the image created in the processing of SA5 described above and, from the extracted recesses, further extracts potential recessed regions for which an area is greater than or equal to a predetermined area (SA7). For example, as illustrated in FIG. 11, regions EB1 to EB12 are extracted as recesses for which the pixel gradation values are less than or equal to the predetermined value, and recesses of small area EB2, EB3, EB4 and EB6 to EB8 are removed. Thus, the regions EB1, EB5, and EB9 to EB12 are extracted as potential recessed regions.

Then, the determination unit 31h of the control device 31 determines the potential recessed region EB5, which is a region other than the potential recessed regions EB1 and EB9 to EB12 that are within the predetermined range near the protruding regions EA1 and EA6 to EA8, as a recessed region (SA8). That is, the determination unit 31h determines the potential recessed regions located within a range of a predetermined distance from the locations of the protruding regions EA1 and EA6 to EA8 as non-recessed regions and, among the potential recessed regions, determines the potential recessed region other than the non-recessed regions in the potential recessed regions as the recessed region. The potential recessed regions EB1 and EB9 to EB12 are determined as non-recessed regions. In this processing, the protruding regions EA1 and EA6 to EA8 are portions where a sheet member (the carcass or the inner liner) overlaps itself and, therefore, many regions are detected as recesses in the vicinities thereof. As such, the potential recessed regions EB1 and EB9 to EB12 are removed so that a portion of the potential recessed regions will not be erroneously detected as recessed regions.

Next, the determination unit 31h of the control device 31 ultimately determines whether or not the recessed region exists (SA9). In the example described above, recessed region EB5 exists.

When it is found that a recessed region exists as a result of the determination of SA9 described above, as illustrated in FIG. 12, an image showing the regions of irregularities on the image created in the processing of SA5 described above is displayed on the display unit 34, and recording processing is performed in which time and date of measurement, type of tire T measured, determination results, and the like are stored in the external memory device 32 (SA10). When it is found that a recessed region does not exist as a result of the determination of SA9 described above, recording processing is performed in which time and date of measurement, type of tire T measured, determination results, and the like are stored in the external memory device 32 (SA11).

Figure 12:
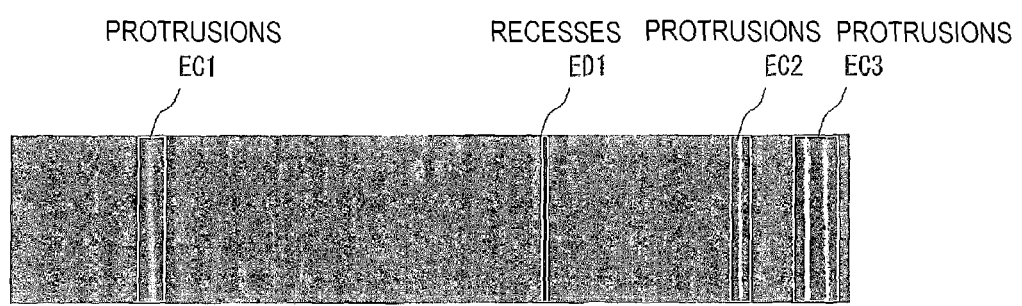
FIG. 12 is a figure illustrating an example of protruding regions and a recessed region extracted in the embodiment of the present technology.

In the processing of SA10 described above, in the image shown in FIG. 12, which is displayed on the display unit 34, protruding region EC1 is a region that includes the protruding region EA1 and the potential recessed regions EB1 to EB3, and recessed region ED1 is a region formed by extending the potential recessed regions EB5 in the tire width direction. That is, the recessed region is enlarged in the tire width direction by subjecting the recessed region, namely the potential recessed region EB5, to expansion processing in the tire width direction. In FIG. 12, the display unit 34 is displaying an image to which a mark, consisting of a rectangle surrounding the recessed region ED1, is added at the location of the recessed region ED1 that has been enlarged in the tire width direction.

Additionally, protruding region EC2 is a region that includes the protruding region EA6 and the potential recessed regions EB7 to EB10, and the protruding region EC3 is a region that includes the protruding regions EA7 and EA8 and the potential recessed regions EB11 and EB12.

As described above, according to the method and device for detecting a bonding defect of material inside a tire of the present embodiment, three-dimensional numerical data of the tire inner surface shape is acquired and an image obtained from the acquired three-dimensional numerical data is processed. As a result, bonding defects of reinforcing sheet members (the carcass and the inner liner) can be automatically extracted. Here, the inspection device main body 30 does not determine regions of recesses located near protruding regions as a recessed region indicating a bonding defect of both end portions of the sheet member, and does determine potential recessed regions at locations separated from the protruding regions as a recessed region indicating a bonding defect of both end portions of the sheet member. As such, determination of a bonding defect of a sheet member can be carried out at higher accuracy than in conventional technologies, and determination with perfect reproducibility is achieved.

The present embodiment includes subjecting the tire inner surface image to spatial frequency processing when the surface irregularity enhanced image is generated. The spatial frequency processing includes filtering processing using a low-pass filter for the tire width direction having an upper cutoff frequency at an absolute value of the spatial frequency, and a band-pass filter for the tire circumferential direction having lower and upper cutoff frequencies at absolute values of the spatial frequencies. As such, recesses and protrusions of the tire inner surface can be reliably extracted.

In the present embodiment, the determination unit 31h extracts the protruding regions as regions for which the pixel gradation value of the image (the surface irregularity enhanced image) after the two-dimensional inverse Fourier transform is greater than or equal to a first threshold value and an area is greater than or equal to a predetermined threshold value; and extracts the potential recessed regions as regions for which the pixel gradation values of the surface irregularity enhanced image are less than or equal to a second threshold value. Therefore, the protruding regions that occur as a result of the both end portions of the sheet member overlapping can be reliably extracted, and the potential recessed regions can be made to reliably include the recessed region indicating a bonding defect of both end portions of the sheet member.

Additionally, in the present embodiment, the image that the determination unit 31h uses is generated by subjecting the two-dimensional Fourier transform image of the tire inner surface image to spatial frequency processing and, thereafter performing a two-dimensional inverse Fourier transform. Therefore, recesses and protrusions of the tire inner surface can be reliably extracted.

In the present embodiment, when determined that a recessed region exists, the recessed region is enlarged in the tire width direction by subjecting the recessed region to expansion processing in the tire width direction, and an image is displayed on which a mark has been added at the location of the enlarged recessed region. Therefore, an operator can easily identify the location of the recessed region indicating a bonding defect of both end portions of a sheet member.

The absolute value of the upper cutoff frequency of the low-pass filter used in the spatial frequency processing is lower than the absolute value of the lower cutoff frequency of the band-pass filter. Therefore, fluctuation of the surface irregularities along the tire width direction can be suppressed so as to be smaller than fluctuations of the surface irregularities along the tire circumferential direction. As such, determination results are stabilized and are free of erroneous determinations of a recessed region indicating a bonding defect of both end portions of a sheet member.

Furthermore, according to the method and device for detecting a bonding defect of material inside a tire of the present embodiment, a two-dimensional type displacement meter or an optical cutting method is used to transform the tire inner surface shape to three-dimensional numerical data, and, thereafter, image processing is performed. Thereby, state where there is insufficiency in an amount of bonding of a reinforcing sheet member can be detected with good accuracy, unaffected by bladders or normal material bonding protruding shapes that exist on the tire inner surface.

Note that in the present embodiment, a two-dimensional type non-contact displacement meter or optical cutting method (hereinafter referred to as "sensor") was used to determine the tire inner surface shape, but preferably an apparatus in which the measurement subject position enters the measurement area of the sensor is selected as the sensor. Additionally, the sensor is preferably set at a location where the sensor measurement optical axis is perpendicular to the tire inner surface.

According to the present technology, three-dimensional numerical data of the tire inner surface shape is acquired and an image obtained from the acquired three-dimensional numerical data is processed. As a result, bonding defects of sheet members (the carcass and the inner liner) can be automatically extracted. Therefore, determination of a bonding defect of a sheet member can be carried out at higher accuracy than in conventional technologies, and determination with perfect reproducibility is achieved.

The invention claimed is:

1. A method for detecting a bonding defect of a sheet member embedded in a tire, the method comprising the steps of:
   acquiring three-dimensional numerical data of surface irregularities of a tire inner surface in a tire of a construction where a sheet member is disposed on a tire circumference, both end portions of the sheet member facing in a tire circumferential direction;
   creating a tire inner surface image from the acquired three-dimensional numerical data, the image expressing height direction data of the surface irregularities as pixel gradation values, while the tire circumferential direction and a tire width direction on the tire inner surface correspond to either of a longitudinal direction and a lateral direction of the image;
   generating a surface irregularity enhanced image from the tire inner surface image in which the surface irregularities of the tire inner surface are enhanced; and
   extracting a protruding region and potential recessed regions of the surface irregularities on a basis of the pixel gradation values of the surface irregularity enhanced image, and determining that among the potential recessed regions, a potential recessed region located within a range of a predetermined distance from a location of the protruding region is not a recessed region resulting from a bonding defect of the end portions of the sheet member, but a potential recessed region located out of the range from the location of the protruding region is a recessed region resulting from the bonding defect, to detect the bonding defect of the sheet member.

2. The method according to claim 1, wherein:
   the step of generating the surface irregularity enhanced image includes subjecting the tire inner surface image to spatial frequency processing; and
   the spatial frequency processing includes filtering processing using:
   a low-pass filter for the tire width direction having an upper cutoff frequency at an absolute value of a spatial frequency, and
   a band-pass filter for the tire circumferential direction having lower and upper cutoff frequencies at absolute values of spatial frequencies.

3. The method according to claim 2, wherein the absolute value of the upper cutoff frequency of the low-pass filter is lower than the absolute value of the lower cutoff frequency of the band-pass filter.

4. The method according to claim 2, wherein the step of generating the surface irregularity enhanced image includes generating the surface irregularity enhanced image by subjecting a two-dimensional Fourier transform image of the tire inner surface image to the spatial frequency processing and, thereafter, performing a two-dimensional inverse Fourier transform.

5. The method according to claim 1, wherein:
   the protruding region is a region for which pixel gradation values of the surface irregularity enhanced image are greater than or equal to a first threshold value and an area is greater than or equal to a predetermined threshold value; and
   the potential recessed regions are regions for which the pixel gradation values of the surface irregularity enhanced image are less than or equal to a second threshold value.

6. The method according to claim 1, wherein, the step of determining further includes a step of enlarging the recessed region in the tire width direction by subjecting the recessed region to expansion processing in the tire width direction, and displaying an image in which a mark is added to the surface irregularity enhanced image at a location of the enlarged recessed region, when determined that the recessed region exists.

7. The method according to claim 1, wherein the step of acquiring the data of the surface irregularities in a step of acquiring the three-dimensional numerical data of the surface irregularities by measuring the surface irregularities of the tire inner surface using a two-dimensional laser displacement meter or an optical cutting method measuring instrument.

8. A device for detecting a bonding defect of a sheet member embedded in a tire, the device comprising:
   an acquisition unit configured to acquire three-dimensional numerical data of surface irregularities of a tire inner surface in a tire of a construction where a sheet member is disposed on a tire circumference, both end portions of the sheet member facing in a tire circumferential direction;
   an image creation unit configured to create a tire inner surface image from the acquired three-dimensional numerical data that expresses height direction data of the surface irregularities as pixel gradation values, while the tire circumferential direction and a tire width direction on the tire inner surface correspond to either of a longitudinal direction and a lateral direction of the image;

an image processing unit configured to generate a surface irregularity enhanced image from the tire inner surface image in which the surface irregularities of the tire inner surface are enhanced; and a determination unit configured to extract a protruding region and potential recessed regions of the surface irregularities on a basis of the pixel gradation values of the surface irregularity enhanced image, and determine that among the potential recessed regions, a potential recessed region located within a range of a predetermined distance from a location of the protruding region is not a recessed region resulting from a bonding defect of the end portions of the sheet member, but a potential recessed region located out of the range from the location of the protruding region is a recessed region resulting from the bonding defect, to detect the bonding defect of the sheet member.

9. The device according to claim 8, wherein:

the image processing unit performs spatial frequency processing on the tire inner surface image; and the spatial frequency processing includes filtering processing using:

a low-pass filter for the tire width direction having an upper cutoff frequency at an absolute value of a spatial frequency, and a band-pass filter for the tire circumferential direction having lower and upper cutoff frequencies at absolute values of spatial frequencies.

10. The device according to claim 9, wherein the absolute value of the upper cutoff frequency of the low-pass filter is lower than the absolute value of the lower cutoff frequency of the band-pass filter.

11. The device according to claim 9, wherein the image processing unit generates the surface irregularity enhanced image by performing the spatial frequency processing on a two-dimensional Fourier transform image of the tire inner surface image and, thereafter, performing a two-dimensional inverse Fourier transform.

12. The device according to claim 8, wherein:

the protruding region is a region for which pixel gradation values of the surface irregularity enhanced image are greater than or equal to a first threshold value and an area is greater than or equal to a predetermined threshold value; and the potential recessed regions are regions for which pixel gradation values of the surface irregularity enhanced image are less than or equal to a second threshold value.

13. The device according to claim 8, further comprising a display unit configured to display an image, wherein:

the image processing unit enlarges the recessed region in the tire width direction by subjecting the recessed region to expansion processing in the tire width direction, and creates a display-use image in which a mark is added at a location of the enlarged recessed region, when the determination unit determines that the recessed region exits; and the display unit displays the display-use image.

14. The device according to claim 8, further comprising a two-dimensional laser displacement meter or an optical cutting method measuring instrument by which the surface irregularities of the tire inner surface are measured, for acquiring the data of the surface irregularities.

15. The method according to claim 1, wherein the tire inner surface is a surface of an inner liner member of the tire with a concavoconvex shape, the tire inner surface facing a tire cavity region that is filled with air for a tire inflation.

16. The device according to claim 8, wherein the tire inner surface is a surface of an inner liner member of the tire with a concavoconvex shape, the tire inner surface facing a tire cavity region that is filled with air for a tire inflation.

* * * * *